United States Patent [19]

McDaniel et al.

[11] Patent Number: 5,595,953
[45] Date of Patent: Jan. 21, 1997

[54] CHROMIUM CATALYST COMPOSITIONS

[75] Inventors: Max P. McDaniel; Elizabeth A. Benham, both of Bartlesville; Rickey D. Badley, Dewey, all of Okla.

[73] Assignee: Phillips Petroleum Company, Bartlesville, Okla.

[21] Appl. No.: 486,872

[22] Filed: Jun. 7, 1995

Related U.S. Application Data

[62] Division of Ser. No. 958,668, Oct. 8, 1992, Pat. No. 5,486,584.

[51] Int. Cl.$^6$ ............................................. B01J 21/08
[52] U.S. Cl. ...................... 502/237; 502/242; 502/256; 502/319; 526/118; 526/119

[58] Field of Search ........................ 502/237, 242, 502/256, 319; 526/118, 119

[56] References Cited

U.S. PATENT DOCUMENTS 4,981,927  1/1991  Rakers et al. ........................ 526/105

*Primary Examiner*—David W. Wu
*Attorney, Agent, or Firm*—Carl D. Corvin

[57] ABSTRACT

Chromium catalyst compositions are provided. Theses chromium catalyst compositions can be used to polymerized olefins. The resulting polymerization product can have improved properties.

24 Claims, No Drawings

CHROMIUM CATALYST COMPOSITIONS

This application is a division of application Ser. No. 07/958,668, now U.S. Pat. No. 5,486,584, filed Oct. 3, 1992.

BACKGROUND OF THE INVENTION

This invention is related to the field of chromium catalyst compositions.

It is known in the art that as the density of a polyolefin composition increases, the chemical resistance, tensile strength, and stiffness increase, but the permeability, toughness, and environmental stress crack resistance decrease. This can present a problem for example, when both a high density and a high environmental stress crack resistance ere desired.

This invention provides a solution to this problem of competing performance factors.

SUMMARY OF THE INVENTION

It is an object of this invention to provide chromium catalyst compositions.

It is another object of this invention to provide chromium catalyst compositions useful in polymerizing olefins.

It is another object of this invention to provide chromium catalyst compositions useful in polymerizing ethylene.

It is another object of this invention to provide chromium catalyst compositions useful in copolymerizing ethylene and at least one other olefin.

It is another object of this invention to provide chromium catalyst compositions useful in copolymerizing ethylene and 1-hexene.

In accordance with this invention chromium catalyst compositions are provided. These chromium catalyst compositions comprise at least two chromium catalyst systems. These chromium catalyst systems comprise chromium and a support, wherein the support comprises silica, and wherein the supports of at least two of the systems have an average pore radius difference sufficient to preferentially introduce a non-ethylene comonomer into the higher molecular weight portion of a resulting copolymer.

In accordance with another embodiment of this invention chromium catalyst compositions are provided (hereafter referred to as "embodiment X"). These chromium catalyst compositions comprise at least two chromium catalyst systems. These chromium catalyst systems comprise chromium and a support, wherein the support consists essentially of silica and titania, and wherein at least two of the supports have an average pore radius difference of about 25 angstroms.

In accordance with another embodiment of this invention chromium catalyst compositions are provided (hereafter referred to as "embodiment Y"). These chromium catalyst compositions comprise at least to chromium catalyst systems wherein:

(a) one of these chromium catalyst systems comprises chromium and a support,
wherein the support consists essentially of silica and titania, and wherein the support has an average pore radius less than about 85 angstroms, and wherein the support has a pore volume less than about 1.2 cubic centimeters per gram, and
wherein this chromium catalyst system is subjected to at least one of the following treatments (1) reduced and reoxidized, (2) titanated, and (3) activated at a high temperature;

(b) one of these chromium catalyst systems comprises chromium and a support,
wherein the support consists essentially of silica, and wherein the support has an average pore radius greater than about 85 angstroms, and wherein the support has a pore volume greater than about 1.5 cubic centimeters per gram, and
wherein this chromium catalyst system is subjected to at least one of the following treatments (1) activated at a low temperature, and (2) contacted with a fluorine compound.

In accordance with another embodiment of this invention chromium catalyst compositions are provided (hereafter referred to as "embodiment Z"). These chromium catalyst compositions comprises at least two chromium catalyst systems wherein:

(a) one of these chromium catalyst systems comprises chromium and a support,
wherein the support consists essentially of silica and titania, and wherein the support has an average pore radius greater: than about 85 angstroms, and wherein the support has a pore volume greater than about 2 cubic centimeters per gram, and
wherein this chromium catalyst system is subjected to at least one of the following treatments (1) reduced and reoxidized, (2) titanated, and (3) activated at a high temperature;

(b) one of these chromium catalyst systems comprises chromium and a support,
wherein the support consists essentially of silica, and wherein the support has an average pore radius less than about 85 angstroms, and wherein the support has a pore volume less than about 1.7 cubic centimeters per gram, and
wherein this chromium catalyst system is reduced.

In accordance with another embodiment of this invention each of the above embodiments can be contacted with one or more different olefins, under polymerization conditions, to produce a polymer or copolymer.

This invention as disclosed in this application can be suitably practiced in the absence of any steps, components, compounds, or ingredients not disclosed herein.

DETAILED DESCRIPTION OF THE INVENTION

In general, the chromium catalyst compositions used in this invention comprise at least two chromium catalyst systems. These chromium catalyst systems comprise a chromium component and a support component comprising silica. The term "support component" is not meant to be construed as an inert component of the chromium catalyst system.

The supports used in the chromium catalyst systems of this invention can:
(1) comprise silicas
(2) consist essentially of silica and titania; or
(3) consist essentially of silica.

These supports are known in the art and are disclosed in U.S. Pat. Nos. 2,825,721; 3,225,023; 3,226,205; 3,622,521; 3,625,864; 3,780,011; 3,887,494; 3,900,457; 3,947,433; 4,053,436; 4,081,407; 4,151,122; 4,177,162; 4,294,724; 4,296,001; 4,392,990; 4,402,864; 4,405,501; 4,434,243; 4,454,557; 4,735;931; 4,981;831; 5,037,911; the entire disclosures of which are hereby incorporated by reference. However, it should also be noted that these types of supports are available commercially from such sources as the Davison Chemical Division of the W. R. Grace Corporation.

The amount of silica present in the support is generally greater than about 80 weight percent where the weight percent is based on the weight of the support. However, it is preferred that the amount of silica in the support is from about 90 to about 100 weight percent. The remaining portion, if any, can be selected from alumina, titania, boria, magnesia, thoria, zirconia, and mixtures of two or more thereof.

When the support consists essentially of silica and titania, the amount of silica in the support is generally greater than about 80 weight percent where the weight percent is based on the weight of the support. However, it is also preferred that the amount of titania used in the support be greater than about 0.1 weight percent. It is more preferred that the amount of titania used is from about 1 weight percent to about 20 weight percent and it is most preferred that the amount be from about 1 weight percent to about 10 weight percent.

In "embodiment X" of this invention, the chromium catalyst compositions comprise at least two chromium catalyst systems. These chromium catalyst systems comprise chromium and supports that consists essentially of silica and titania. These supports should have an average pore radius difference of about 25 angstroms. However, it is preferred that the average pore radius difference be from about 25 angstroms to about 400 angstroms and it is most preferred if the average pore radius difference is from 50 angstroms to 300 angstroms. The average pore radius of each support can be determined by nitrogen sorption by a person with ordinary skill in the art. For example, the following references can be used "Adsorption, Surface Area and Porosity" by S. J. Gregg and K. S. W. Sing, Academic Press, London (1982); and "Introduction to Powder Surface Area" by S. Lowell, J. Wiley & Sons, New York, N.Y. (1979); the entire disclosures of which are hereby incorporated by reference.

In "embodiment Y" of this invention the chromium catalyst compositions comprise at least two chromium catalyst systems. One of these chromium catalyst systems comprises chromium and a support wherein the support consists essentially of silica and titania. Another of these chromium catalyst systems comprises chromium and a support wherein the support consists essentially of silica.

The supports used in "embodiment Y" are further described as follows:

(1) the supports that consist essentially of silica and titania should have an average pore radius less than about 85 angstroms; however, it is preferred that they have an average pore radius from about 25 to about 85 angstroms and it is most preferred that they have an average pore radius from 30 to 80 angstroms;

furthermore, the supports that consist essentially of silica and titania should have a pore volume less than about 1.2 cubic centimeters per gram; however, it is preferred that they have a pore volume from about 0.6 to about 1.2 cubic centimeters per gram and it is most preferred that they have a pore volume from 0.8 to 1.15 cubic centimeters per gram;

hereafter, these types of supports will be referred to as "type A supports";

(2) the supports that consist essentially of silica should have an average pore radius greater than about 85 angstroms; however, it is preferred that they have an average pore radius from about 85 to about 1000 angstroms and it is most preferred that they have an average pore radius from 90 to 500 angstroms;

furthermore, the supports that consist essentially of silica should have a pore volume greater than about 1.5 cubic centimeters per gram; however, it is preferred that they have a pore volume from about 1.5 to about 4 cubic centimeters per gram and it is most preferred that they have a pore volume from 1.5 to 3 cubic centimeters per gram;

hereafter, these types of supports will be referred to as "type B supports."

In "embodiment Z" of this invention the chromium catalyst compositions comprise at least two chromium catalyst systems. One of these chromium catalyst systems comprises chromium and a support wherein the support consists essentially of silica and titania. Another of these chromium catalyst systems comprises chromium and a support wherein the support consists essentially of silica.

The supports used in "embodiment Z" are further described as follows:

(1) the supports that consist essentially of silica and titania should have an average pore radius greater than about 85 angstroms; however, it is preferred that they have an average pore radius from about 85 to about 1000 angstroms and it is most preferred that they have an average pore radius from 90 to 500 angstroms;

furthermore, the supports that consist essentially of silica and titania should have a pore volume greater than about 2 cubic centimeters per gram; however, it is preferred that they have a pore volume from about 2 to about 4 cubic centimeters per gram and it is most preferred that they have a pore volume from 2 to 3 cubic centimeters per gram;

hereafter, these types of supports will be referred to as "type C supports";

(2) the supports that consist essentially of silica should have an average pore radius less than about 85 angstroms; however., it is preferred that they have an average pore radius from about 25 to about 85 angstroms and it is most preferred that they have an average pore radius from 30 to 80 angstroms;

furthermore, the supports that consist essentially of silica should have a pore volume less than about 1.7 cubic centimeters per gram; however, it is preferred that they have a pore volume from about 0.6 to about 1.7 cubic centimeters per gram and it is most preferred that they have a pore volume from 0.8 to 1.3 cubic centimeters per gram;

hereafter, these types of supports will be referred to as "type D supports."

The chromium component of the chromium catalyst systems that are part of the chromium catalyst compositions of this invention can be any suitable chromium compound that facilitates the polymerization of olefins. Suitable examples of chromium compounds included, but are not limited to, chromium nitrate, chromium acetate, chromium trioxide, and mixtures of two or more said chromium compounds. The amount of chromium compound that is combined with the support is from about 0.1 weight percent to about 5 weight percent. It is preferred that the amount be from about 0.2 weight percent to about S weight percent and it is most preferred that the amount be from 0.5 to 2 weight percent where the weight percent is based on the weight of the chromium compound and the support.

The chromium compound can be combined with the support in any manner know in the art. Examples of combining the chromium compound with the support can be found in the above Cited and incorporated patents. Preferred methods of combining the chromium compound with the support are disclosed in U.S. Pat. No. 3,976,632; 4,248,735; 4,297,460; and 4,397,766; the entire disclosures of which are hereby incorporated by reference. These patents disclose impregnating the support with anhydrous chromium compounds.

In "embodiment Y" of this invention, chromium catalyst systems that comprise chromium and "type A supports" are (1) reduced and reoxidized, (2) titanated, and/or (3) activated at a high temperature. Additionally, in "embodiment Y" of this invention, chromium catalyst systems that comprise chromium and "type B supports" are (1) activated at a low temperature, and/or (2) contacted with a fluorine compound. At least a portion of the chromium used in this embodiment of the invention is preferably in the hexavalent state.

In "embodiment Z" of this invention, chromium catalyst systems that comprise chromium and "type C supports" are (1) reduced and reoxidized, (2) titanated, and/or (3) activated at a high temperature. Additionally, in "embodiment Z" of this invention, chromium catalyst systems that comprise chromium and "type D supports are reduced." At least a portion of the chromium used with the "type C supports" is preferably in the hexavalent state. On the other hand, at least a portion of the chromium used with the "type D supports" is preferably in the divalent state.

The chromium catalyst systems used in this invention can be reduced and reoxidized in accordance with any manner known in the art that will reduce at least a portion of the chromium to a lower valence state and then reoxidized at least a portion of the chromium to a higher valence state. Suitable examples of this type of procedure can be found in U.S. Pat. Nos. 4,151,122 and 4,177,162 the entire disclosures of which are hereby incorporated by reference.

The chromium catalyst systems used in this invention can be titanated in accordance with any manner known in the art that will combine a titanium compound with the chromium catalyst system. Suitable examples of this type of procedure can be found in U.S. Pat. Nos. 3,622,521; 3,625,864; 3,780,011; 4,368,303; 4,402,864; 4,424,320; and 4,429,724; 4,434,243; the entire disclosures of which are hereby incorporated by reference.

The chromium catalyst systems used in this invention can be reduced in accordance with any manner known in the art that will reduce at least a portion of the chromium to a lower valence state. Suitable examples of this type of procedure can be found in U.S. Pat. No. 4,735,931 the entire disclosure of which is hereby incorporated by reference. It is preferred that the reducing composition be carbon monoxide.

The chromium catalyst systems used in this invention can be contacted with a fluorine compound in accordance with any manner known in the art that will incorporated fluorine onto or into the chromium catalyst system. Suitable examples of this type of procedure can be found in U.S. Pat. Nos. 2,825,721; 4,806,513; and 5,037,911; the entire disclosures of which are hereby incorporated by reference.

The chromium catalyst systems used in this invention can be activated in accordance with any manner known in the art that will contact an oxygen containing ambient with a chromium catalyst system. Suitable examples of this type of procedure can be found in U.S. Pat. Nos. 3,887,494; 3,900,457; 4,053,436; 4,081,407; 4,296,001; 4,392,990; 4,405,501; 4,981,831; the entire disclosures of which are hereby incorporated by reference.

In general, activation at high temperature is conducted at a temperature greater than about 700 degrees Celsius and activation at low temperature is conducted at a temperature less than about 700 degrees Celsius. However, it is preferred that activation at a high temperature be conducted at a temperature between about 750 degrees Celsius and about 900 degrees Celsius; and most preferably it is conducted at a temperature between 800 degrees Celsius and 900 degrees Celsius. It is also preferred that activation at a low temperature be conducted at a temperature between about 450 degrees Celsius and about 700 degrees Celsius; and most preferably it is conducted at a temperature between 500 degrees Celsius and 650 degrees Celsius.

Once the chromium catalyst systems are made they may be combined together in any manner known in the art. For example, they can be dry blended together in a mixer or added to a feed stream that leads to a reactor. It is important to note that by varying the amounts of each chromium catalyst system included in the chromium catalyst composition, it is possible to vary the amount of comonomer incorporated into the resulting copolymer composition. Furthermore, by varying the amount of each chromium catalyst system included in the chromium catalyst composition, the density of the resulting polymer can be modified more independently of the melt index than was previously known for these types of chromium catalyst systems. Additionally, by varying the amount of each chromium catalyst system included in the chromium catalyst composition, or by varying the average pore radius difference between the supports in the chromium catalyst compositions, possible to preferentially introduce a non-ethylene comonomer into the higher molecular weight portion of a resulting copolymer. In general, the higher molecular weight portion can be determined using collected by gel permeation chromatography using equipment readily available from commercial sources. The higher molecular weight portion is that portion greater than the weight average molecular weight. Preferentially introducing a non-ethylene comonomer into the higher molecular weight portion of a resulting copolymer means that a major portion of the comonomer is located in the higher molecular weight portion. This can be determined by calculating the number of short chain alkyl branches in the polymer. For example, in an ethylene and 1-hexene copolymer the number of butyl branches will give an indication of the amount of 1-hexene comonomer incorporated into the polymer.

The chromium catalyst compositions used in this invention can be contacted with one or more olefins under polymerization conditions to produce homopolymer or copolymer compositions. Suitable olefins include, but are not limited to, ethylene, propylene, 1-butene, 3-methyl-1-butene, 1-pentene, 3-methyl-1-pentene, 4-methyl-1-pentene, 1-hexene, 3-ethyl-1-hexene, 1-octene, 1-decene and mixtures of two or more of said olefins. Particularly preferred is ethylene. Additionally, a particularly preferred combination of olefins to use is ethylene and 1-hexene. These two olefins are particularly preferred at this rise because these olefins copolymerized especially well with the chromius catalyst compositions disclosed in this invention.

Various polymerization schemes are known in the art. For example, U.S. Pat. Nos. 2,825,721; 3,152,872; 3,172,737; 3,203,766; 3,225,023; 3,226,205; 3,242,150; 3,248,179; and 4,121,029; (the entire disclosures of which are hereby incorporated by reference) disclose several polymerization schemes. A particularly preferred polymerization method is a slurry or particle form polymerization method. This method is disclosed for example, in U.S. Pat. No. 3,248,179. Two preferred slurry polymerization techniques are those employing a loop reactor and those employing a plurality of stirred reactors either in series, parallel or combinations thereof.

EXAMPLE

This example is provide to further assist a person skilled in the art with understanding this invention. The particular reactants, catalysts and conditions are intended to be generally illustrative of this invention and are not meant to be construed as unduly limiting the reasonable scope of this invention.

The polymerizations were conducted in a 87 liter, 15.2 centimeter diameter, pipe loop reactor. The polymer was recovered in a flash chamber. A Vulcan dryer was used to dry the polymer.

Ethylene that had been dried over alumina was used as the polymerization monomer. Isobutane that had been degassed by fractionation and dried over alumina was use as the polymerization diluent. Triethylboron was also used as a cocatalyst.

A "Quantachrome Autosorb-6 Nitrogen Pore Size Distribution Instrument" was used to determined the average pore radius and pore volumes of the supports. This instrument was acquired from the Quantachrome Corporation, Syosset, N.Y. The average pore radius was calculated using the following formula:

average pore radius in Angstroms =

$$(4 \times 10^4) \frac{\text{pore volume in cubic centimeters per gram}}{\text{surface area in square meters per gram}}$$

In run number one the following chromium catalyst compositions were used:

(1) a commercially available chromium catalyst system purchased from the W. R. Grace Corporation. This chromium catalyst system was the Magnapore Catalyst. It had an average pore radius of about 94 angstroms and a pore volume of about 2.1 cubic centimeters per gram. It also had a chromium content of about 1 weight percent based on the weight of the chromium catalyst system. This chromium catalyst system was reduced at a temperature of about 845 degrees Celsius and then reoxidized at a temperature of about 650 degrees Celsius;

(2) a commercially available chromium catalyst system purchased from the W. R. Grace Corporation. This chromium catalyst system was the 969ID catalyst. It had an average pore radius of about 78 angstroms and a pore volume of about 1.1 cubic centimeters per gram. It also had a chromium content of about 1 weight percent based on the weight of the chromium catalyst system. This chromium catalyst system was activated at a temperature of about 540 degrees Celsius and then reduced at a temperature of about 370 degrees Celsius with carbon monoxide. This catalyst system produce mono-1-hexene during the polymerization of ethylene.

These two catalyst systems were then blended together and use to polymerize ethylene. Additional information concerning this polymerization and the results obtain are presented in table E1.

TABLE E1

| 1 | Reactor Residence Time | 1.23 hours |
|---|---|---|
| 2 | Reactor Temperature | 107° C. |
| 3 | Triethylboron Amount in Parts per Million by Weight Based on the Isobutane Diluent | 2.7 |
| 4 | Melt Indexes of the Copolymer According to ASTM-D-1238 | 0.35 g/10 mins. |
| 5 | Density of Copolymer According to ASTM-D-1505 | 0.9555 g/cc |
| 6 | Environmental Stress Crack Resistance of the Copolymer According to ASTM-D-1693 | 220 hours |

In run number two the following chromium catalyst compositions were used:

(1) a commercially available chromium catalyst system purchased from the W. R. Grace Corporation. This chromium catalyst system was the Magnapore Catalyst. It had an average pore radius of about 94 angstroms and a pore volume of about 2.1 cubic centimeters per gram. It also had a chromium content of about 1 weight percent based on the weight of the chromium catalyst system. This chromium catalyst system was reduced at a temperature of about 870 degrees Celsius ,end then reoxidized at a temperature of about 590 degrees Celsius;

(2) a commercially available chromium catalyst system purchased from the W. R. Grace Corporation. This chromium catalyst system was the 969ID catalyst. It had an average pore radius of about 78 angstroms and a pore volume of about 1.1 cubic centimeters per gram. It also had a chromium content of about 1 weight percent based on the weight of the chromium catalyst system. This chromium catalyst system was activated at a temperature of about 650 degrees Celsius and then reduced at a temperature of about 370 degrees Celsius with carbon monoxide. This catalyst system produce mono-1-hexene during the polymerization of ethylene.

These two catalyst systems were then blended together and use to copolymezie ethylene and mono-1-hexene. Additional information concerning this polymerization and the results obtained is presented in table E2.

TABLE E2

| 1 | Reactor Residence Time | 1.22 hours |
|---|---|---|
| 2 | Reactor Temperature | 96° C. |
| 3 | Triethylboron Amount in Parts per Million by Weight Based on the Isobutane Diluent | 2.57 |
| 4 | Melt Indexes of the Copolymer According to ASTM-D-1238 | 0.09 g/10 mins. |
| 5 | Density of Copolymer According to ASTM-D-1505 | 0.9551 g/cc |
| 6 | Environmental Stress Crack Resistance of the Copolymer According to ASTM-D-1693 | 262 hours |

For comparison purposes a commercially available chromium catalyst was obtain from the Davison Corporation (tradename of 969MS). This catalyst had an average pore radius of about 94 angstroms and a pore volume of about 1.5 cubic grams per centimeter. Under polymerization conditions similar to the above it produced a copolymer having the following characteristics:

| Melt index of | 0.3 grams/10 minutes. |
|---|---|
| Density of | 0.957 grams/cubic centimeter |
| ESCR of | 100 hours |

It can be seen from the above that a copolymer, having both a high density and a high environmental stress crack resistance can be obtained by using this invention. This is especially apparent when comparing the copolymer produced from the 969MS catalyst to the copolymers produced according to this invention.

That which is claimed is:

1. A chromium catalyst composition, which is useful for producing a copolymer by copolymerizing ethylene and at least one non-ethylene comonomer, wherein said copolymer has a high molecular weight portion that has a molecular weight greater than the weight average molecular weight of said copolymer, said chromium catalyst composition comprises at least two chromium catalyst systems, wherein each said chromium catalyst system comprises chromium and a support, and wherein each support comprises silica, and wherein at least two of said chromium catalyst systems have supports that have an average pore radius difference sufficient to preferentially introduce said non-ethylene comonomer into said higher molecular weight portion wherein said average pore radius difference is from about 25 to about 400 angstroms.

2. A chromium catalyst composition according to claim 1 wherein at least one of said supports comprises at least 80 weight percent silica based on the weight of said support.

3. A chromium catalyst composition according to claim 1 wherein at least one of said supports comprises at least 90 weight percent silica based on the weight of said support.

4. A chromium catalyst composition according to claim 1 wherein said supports consist essentially of silica and titania, and wherein at least two of said supports have an average pore radius difference of about 25 angstroms.

5. A chromium catalyst composition according to claim 4 wherein said supports consist essentially of at least 80 weight percent silica and at least 0.1 weight percent titania where the weight percent is based on the weight of said supports.

6. A chromium catalyst composition according to claim 4 wherein said supports consist essentially of at least 90 weight percent silica and at least 1 weight percent titania where the weight percent is based on the weight of said supports.

7. A chromium catalyst composition according to claim 4 wherein said chromium is present in said chromium catalyst systems in an amount from about 0.1 to about 5 weight percent.

8. A chromium catalyst composition according to claim 1 wherein said average pore radius difference is from 50 to 300 angstroms.

9. A chromium catalyst composition according to claim 1 wherein:
   (a) at least one of said chromium catalyst systems comprises chromium and a support,
   wherein said support consists essentially of silica and titania, and wherein said support has an average pore radius from about 25 to about 85 angstroms, and wherein said support has a pore volume from about 0.6 to about 1.2 cubic centimeters per gram, and
   wherein this chromium catalyst system is subjected to at least one of the following treatments (1) reduced and reoxidized, (2) titanated, and (3) activated at a temperature greater than or equal to 700° C.; and
   (b) at least one of said chromium catalyst systems comprises chromium and a support,
   wherein said support consists essentially of silica, and wherein said support has an average pore radius from about 85 to about 1000 angstroms, and wherein said support has a pore volume from about 1.5 to about 4 cubic centimeters per gram, and
   wherein this chromium catalyst system is subjected to at least one of the following treatments (1) activated at a temperature less than 700° C., and (2) contacted with a fluorine compound.

10. A chromium catalyst composition according to claim 9 wherein said silica-titania support consists essentially of at least 80 weight percent silica and at least 0.1 weight percent titania where the weight percent is based on the weight of said support.

11. A chromium catalyst composition according to claim 9 wherein said silica-titania support consists essentially of at least 90 weight percent silica and at least 1 weight percent titania where the weight percent is based on the weight of said support.

12. A chromium catalyst composition according to claim 9 wherein said silica-titania support has an average pore radius from 30 to 80 angstroms.

13. A chromium catalyst composition according to claim 9 wherein said silica-titania support has an pore volume from 0.8 to 1.15 cubic centimeters per gram.

14. A chromium catalyst composition according to claim 9 wherein said silica support has an average pore radius from 90 to 500 angstroms.

15. A chromium catalyst composition according to claim 9 wherein said silica support has an pore volume from 1.5 to 3 cubic centimeters per gram.

16. A chromium catalyst composition according to claim 9 wherein said chromium is present in said chromium catalyst systems in an amount from about 0.1 to about 5 weight percent.

17. A chromium catalyst composition according to claim 1 wherein:
   (a) at least one of said chromium catalyst systems comprises chromium and a support,
   wherein said support consists essentially of silica and titania, and wherein said support has an average pore radius from about 85 to about 1000 angstroms, and wherein said support has a pore volume from about 2 to about 4 cubic centimeters per gram, and
   wherein this chromium catalyst system is subjected to at least one of the following treatments (1) reduced and reoxidized, (2) titanated, and (3) activated at a temperature greater than or equal to 700° C.;
   (b) at least one of said chromium catalyst systems comprises chromium and a support,
   wherein said support consists essentially of silica, and wherein said support has an average pore radius from about 25 to about 85 angstroms, and wherein said support has a pore volume from about 0.6 to about 1.7 cubic centimeters per gram, and
   wherein this chromium catalyst system is reduced.

18. A chromium catalyst composition according to claim 17 wherein said silica-titania support consists essentially of at least 80 weight percent silica and at least 0.1 weight percent titania where the weight percent is based on the weight of said support.

19. A chromium catalyst composition according to claim 17 wherein said silica-titania support consists essentially of at least 90 weight percent silica and at least 1 weight percent titania where the weight percent is based on the weight of said support.

20. A chromium catalyst composition according to claim 17 wherein said silica-titania support has an average pore radius from 90 to 500 angstroms.

21. A chromium catalyst composition according to claim 17 wherein said silica-titania support has an pore volume from 2 to 3 cubic centimeters per gram.

22. A chromium catalyst composition according to claim 17 wherein said silica support has an average pore radius from 30 to 80 angstroms.

23. A chromium catalyst composition according to claim 17 wherein said silica support has an pore volume from 0.8 to 1.3 cubic centimeters per gram.

24. A chromium catalyst composition according to claim 17 wherein said chromium is present in said chromium catalyst systems in an amount from about 0.1 to about 5 weight percent.

* * * * *